United States Patent [19]

Tamony et al.

[11] 4,294,928
[45] Oct. 13, 1981

[54] DENITRIFICATION OF A GAS STREAM

[75] Inventors: Andree E. Tamony, Antioch; Charles R. Youngson, Jr., Concord, both of Calif.

[73] Assignee: The Dow Chemical Company, Midland, Mich.

[21] Appl. No.: 176,439

[22] Filed: Aug. 8, 1980

[51] Int. Cl.³ .............................................. B01D 53/34
[52] U.S. Cl. .................................................... 423/235
[58] Field of Search ......................................... 423/235

[56] References Cited

U.S. PATENT DOCUMENTS 3,149,907  9/1964  Karwat ................................. 423/235
4,035,470  7/1979  Senjo et al. .......................... 423/235

FOREIGN PATENT DOCUMENTS 50-67286  6/1975  Japan ................................... 423/235
51-89889  8/1976  Japan ................................... 423/235
52-52179  4/1977  Japan ................................... 423/235

OTHER PUBLICATIONS

Meller, J. W., *Comp. Treatise on Inorg. & Theoret. Chem.*, vol. VIII; Longmans Green & Co., N.Y. 1928, p. 433.

*Supplement To Mellors Comp. Treatise* Supp. II part L, p. 356.

*Primary Examiner*—G. O. Peters
*Attorney, Agent, or Firm*—M. L. Glenn

[57] ABSTRACT

Nitric oxide and other oxides of nitrogen removed from a gas stream by contacting the gas stream with chlorine in the presence of water in the liquid phase and scrubbing the gas stream with an aqueous mixture of a hydrochloride and a hypochlorite.

1 Claim, No Drawings

DENITRIFICATION OF A GAS STREAM

BACKGROUND OF THE INVENTION

The oxides of nitrogen, especially nitric oxide and nitrogen dioxide, are noxious gases which are common combustion products found in stack gases from furnaces fired with coal or other fuels. Because the oxides of nitrogen, hereafter referred to as $NO_x$, are primary contributors to the creation of photochemical smog and its accompanying health problems, the amount of these gases which may be released into the atmosphere is limited. Nitrogen dioxide is readily soluble in certain scrubbing solutions such as sodium hydroxide and sodium hypochlorite, but nitric oxide is not very soluble in most aqueous solutions. Therefore, it is usually necessary to oxidize the nitric oxide present in a stack gas to nitrogen dioxide before the gas stream may be scrubbed to effectively remove the $NO_x$.

Chlorine dioxide has been taught as a means for oxidizing nitric oxide to the more soluble nitrogen dioxide prior to scrubbing (U.S. Pat. No. 4,035,470), but in general the oxidation of nitric oxide using chlorine is too slow to be of practical value in commercial operations.

SUMMARY OF THE INVENTION

The present invention is directed toward a process for removing $NO_x$ from a gas stream containing $NO_x$ which comprises contacting the $NO_x$ in the gas stream with an excess of chlorine in the presence of water in the liquid phase and scrubbing the gas stream with an effective aqueous scrubbing solution for nitrogen dioxide. It has been found that nitric oxide is rapidly oxidized to other oxides of nitrogen and that the solubility of $NO_x$ in the system is significantly increased when chlorine is added to the gas stream in the presence of water in the liquid phase. Using the method described herein, nitric oxide reductions of better than 90% have been achieved.

The oxidation of nitric oxide to other oxides of nitrogen proceeds over a wide range of temperatures. The upper limit of operability is generally determined by the boiling point of the water or aqueous solution present during the oxidation. Likewise, the lower limit is determined by the freezing point of water or the aqueous solution. Preferably, the reaction is carried out between about 10° C. and about 50° C. Most conveniently, the reaction is simply carried out at ambient temperatures.

DETAILED DESCRIPTION OF THE INVENTION

In carrying out the process that is the subject of the invention chlorine gas is injected into the gas stream in the presence of water in the liquid phase. In a convenient way of practicing the invention the gas stream is injected along with chlorine gas into an absorber-quench column which contains water or aqueous hydrochloric acid. As already noted, it is generally unnecessary to heat the gas stream or the liquid in the column since the reaction will usually proceed in a favorable manner at ambient temperature.

The water present must be in the liquid phase. The water may be in the form of a solution, i.e., it may contain various solutes, or it may be present in the form of droplets as, for example, in a spray or mist. Generally, the water is simply circulated through a column into which the gas stream and chlorine are injected. This phase of the process usually proceeds most favorably when the pH of the water is below 7. Since hydrochloric acid is produced during the oxidation of the nitric oxide, it is unnecessary to add acid to keep the pH down. Generally, water must be continually added to keep the acid sufficiently dilute to prevent the loss of hydrogen chloride gas from the water. The hydrochloric acid may be recovered from the system as product.

Although it is not desired that the invention be limited to the following explanation of how the nitric oxide is oxidized and the $NO_x$ absorption occurs, the major reactions involved are postulated to be as follows:

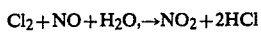
$$Cl_2 + NO + H_2O \rightarrow NO_2 + 2HCl$$

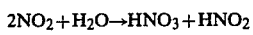
$$2NO_2 + H_2O \rightarrow HNO_3 + HNO_2$$

This explanation is offered merely to clarify the invention in light of the current understanding of what reactions may be happening. However, the present invention should not be limited to any particular mechanism.

The oxidation of the nitric oxide and its subsequent scrubbing proceeds most favorably when the nitric oxide concentration is relatively high, i.e., greater than 1000 ppm. At lower concentrations, the removal of nitric oxide from the gas stream is less effective. For example, when the nitric oxide concentration is about 100 ppm, nitric oxide removal is only about 50–60%, while at concentrations in excess of 1000 ppm removal of greater than 90% of the nitric oxide may be achieved.

In oxidizing the nitric oxide sufficient chlorine gas must be injected into the gas stream to achieve optimal oxidation. Usually an excess of chlorine is used, that is, an amount over and above that which is stoichiometrically required to oxidize the nitric oxide. Assuming the above mechanism is correct, one mole of chlorine gas is required to oxidize one mole of nitric oxide. Therefore, most preferably at least two or three moles of chlorine are used to oxidize one mole of nitric oxide. The excess chlorine will pass out of the quench column along with the gas stream into the scrubbing column.

The oxidation of the nitric oxide occurs very rapidly when conducted in the manner herein described. Of course, it is necessary to have a sufficient residence time in the quench column to oxidize substantially all of the nitric oxide present. A residence of time of from about 3 to 10 seconds has been found to be generally suitable for use in carrying out the process of this invention.

Following the oxidation of the nitric oxide in the quench column, the gas stream along with any excess chlorine gas is sent to a scrubbing column wherein the $NO_x$ and chlorine are removed. In carrying out the process herein described, the scrubbing solution is usually an aqueous solution of sodium or potassium hydroxide, preferably also containing some sodium or potassium hypochlorite. The hypochlorite normally will form and be present as a result of the reaction of the hydroxide and chlorine. The hypochlorite has been found to aid in the scrubbing of the $NO_x$ and is partly responsible for the high efficiency of the above-described process in removing $NO_x$. The hypochlorite assures that any nitrogen oxide remaining in the gas stream is oxidized to nitrogen dioxide, thus assuring maximum removal of $NO_x$ from the gas stream. Although the temperature at which the scrubbing operation takes place is not critical, generally, optimal performance is achieved at between about 30° C. and 50° C.

In summary, one preferred method for carrying out the process of the invention is to mix the gas stream contaminated with $NO_x$ with an excess of chlorine gas. The gas mixture is injected into a quench column containing circulating aqueous hydrochloric acid into which fresh water is added to maintain an acid concentration of about 22%. In this step, the nitric oxide is oxidized to other oxides of nitrogen. The gas stream and excess chlorine then pass into a scrubbing column containing a mixture of sodium hydroxide and sodium hypochlorite where the $NO_x$ and chlorine are scrubbed. The gas stream, free of chlorine and $NO_x$, is either vented to the atmosphere or sent on for further treatment.

A further advantage of the process herein described over other methods for removing $NO_x$ is that the process is compatible with other wastes which also may be present in the gas stream. For example, iron compounds, such as ferric oxide or particulate carbon, may be present in the gas stream without adversely affecting the removal of $NO_x$. Many other systems, such as those using noble metal catalysts, may be poisoned if certain materials are not removed from the gas stream prior to treatment. This is usually not a problem with the process herein described.

The following examples will serve to further illustrate the invention, but are not to be construed as a limitation thereon.

EXAMPLE 1

A gas stream (18 lb. mole/hour) generated from the combustion of chlorinated wastes was found to contain 72 ppm nitric oxide and 410 ppm $NO_x$ as well as various amounts of carbon dioxide, oxygen, nitrogen, water, hydrochloric acid, chlorine, ferric oxide and carbon. Chlorine gas (0.08 lb. moles/hour) was injected and the gas mixture was quenched in a quench column containing 26% hydrochloric acid. The gas leaving the quench column was found to contain 22 ppm nitric oxide and 395 ppm $NO_x$. The gas stream was passed into a scrubbing column containing an aqueous sodium hydroxide-carbonate solution of pH 9.8. The aqueous scrubbing solution also contained about 1.5% by weight of sodium hypochlorite. The gas exiting from the scrubbing column was found to contain less than 2 ppm of chlorine, 9.5 ppm of nitric oxide and 75 ppm of $NO_x$.

EXAMPLE 2

Flue gas (18 lb. moles/hour) containing carbon dioxide, oxygen, nitrogen, water, nitric oxide (1672 ppm) and $NO_x$ (2200 ppm) had 0.09 lb. moles of chlorine per hour injected into it. The mixture of gases was quenched with water in a quench column. The gas exiting the quench column was found to contain 75 ppm nitric oxide and 1780 ppm $NO_x$. The gas was sent to a scrubbing column containing aqueous sodium hydroxide (ph 9.8) and 1.5% sodium hypochlorite. Following the scrubbing operation, the flue gas was found to contain 102 ppm of nitric oxide, 580 ppm of $NO_x$ and less than 2 ppm of chlorine.

EXAMPLE 3

In a manner similar to that in Example 2 above, flue gas (18 lb. moles/hr.) containing 2020 ppm nitric oxide and 2175 ppm $NO_x$ was injected with 0.09 lb. moles/hr. of chlorine gas. The mixture of gases was quenched with water in a quench column, and it was found that nitric oxide present had dropped to 40 ppm and $NO_x$ to 1300 ppm. The gaseous mixture was passed through a scrubbing column containing aqueous sodium hydroxide (pH 9.8) and about 1.5% sodium hypochlorite. Following scrubbing, the gas stream was found to contain 155 ppm of nitric oxide and 400 ppm of $NO_x$. This represented an overall reduction of $NO_x$ of 82%.

What is claimed is:

1. A process for removing $NO_x$ from a gas stream wherein at least part of the $NO_x$ is present as nitric oxide which comprises (a) mixing more than one molecular proportion of chlorine per molecular proportion of said nitric oxide with the gas stream, (b) subsequently contacting the resulting mixture of gases with aqueous hydrochloric acid at a temperature of from about 10° C. to about 50° C. for a time sufficient to oxidize a substantial proportion of the nitric oxide present, and (c) scrubbing the gas stream exiting from step (b) with a mixture of aqueous sodium hydroxide and sodium hypochlorite at a temperature of from about 30° C. to about 50° C.

* * * * *